(12) United States Patent
Motakef et al.

(10) Patent No.: US 8,356,466 B2
(45) Date of Patent: Jan. 22, 2013

(54) LOW GRADE HEAT RECOVERY SYSTEM FOR TURBINE AIR INLET

(75) Inventors: Abbas Motakef, Norcross, GA (US); Peter Feher, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 831 days.

(21) Appl. No.: 12/332,385

(22) Filed: Dec. 11, 2008

(65) Prior Publication Data

US 2010/0146930 A1 Jun. 17, 2010

(51) Int. Cl.
*F02C 6/00* (2006.01)
*F02C 3/30* (2006.01)

(52) U.S. Cl. ........ 60/39.182; 60/39.53; 60/728; 60/775; 60/39.511

(58) Field of Classification Search ................. 60/39.53, 60/39.182, 728, 775, 39.511
See application file for complete search history.

(56) References Cited

U.S. PATENT DOCUMENTS

| | | | |
|---|---|---|---|
| 3,788,066 A | 1/1974 | Nebgen | |
| 3,796,045 A | 3/1974 | Foster-Pegg | |
| 4,519,207 A | 5/1985 | Okabe et al. | |
| 5,203,161 A | 4/1993 | Lehto | |
| 6,318,065 B1 | 11/2001 | Pierson | |
| 6,470,686 B2 | 10/2002 | Pierson | |
| 6,532,754 B2 | 3/2003 | Haley et al. | |
| 6,769,258 B2 | 8/2004 | Pierson | |
| 6,848,267 B2 | 2/2005 | Pierson | |
| 6,964,168 B1 | 11/2005 | Pierson et al. | |
| 7,178,348 B2 | 2/2007 | Stuhlmueller | |
| 7,343,746 B2 | 3/2008 | Pierson | |
| 2002/0053196 A1* | 5/2002 | Lerner et al. | 60/39.182 |
| 2005/0056023 A1 | 3/2005 | Pierson | |
| 2005/0103032 A1 | 5/2005 | Pierson | |
| 2005/0223728 A1* | 10/2005 | Stuhlmueller | 62/238.3 |
| 2007/0240400 A1* | 10/2007 | Smith et al. | 60/39.182 |
| 2007/0248453 A1 | 10/2007 | Tetu et al. | |
| 2007/0294984 A1 | 12/2007 | Chillar et al. | |
| 2008/0098890 A1 | 5/2008 | Feher | |
| 2008/0098891 A1 | 5/2008 | Feher et al. | |

FOREIGN PATENT DOCUMENTS

| | | |
|---|---|---|
| DE | 10214183 C1 | 5/2003 |
| EP | 0378003 A1 | 7/1990 |
| EP | 0945607 A2 | 9/1999 |
| EP | 1884640 A1 | 2/2008 |
| FR | 2399542 A1 | 3/1979 |
| GB | 2002057 A | 2/1979 |
| GB | 2364553 A | 1/2002 |
| WO | 2005/119029 A1 | 12/2005 |

OTHER PUBLICATIONS

Search Report from corresponding EP Application No. 09177612.0, Jun. 8, 2011.

* cited by examiner

*Primary Examiner* — William H Rodriguez
*Assistant Examiner* — Michael B Mantyla
(74) *Attorney, Agent, or Firm* — Sutherland Asbill & Brennan LLP

(57) ABSTRACT

A heating and cooling system for inlet air of a gas turbine engine in a combined cycle power plant having a steam turbine. The heating and cooling system may include a fluid coil positioned about the gas turbine engine, a heat exchanger in communication with the fluid coil, and a condenser in communication with the steam turbine and the heat exchanger such that waste heat from the steam turbine is forwarded to the fluid coil.

5 Claims, 1 Drawing Sheet

LOW GRADE HEAT RECOVERY SYSTEM FOR TURBINE AIR INLET

TECHNICAL FIELD

The present application relates generally to gas turbine engines and more particularly relates to gas turbine air inlet heating using an ultra low grade heat recovery system with a combined cycle power plant.

BACKGROUND OF THE INVENTION

Turbine air inlet heating and cooling systems generally use a cold/hot water coil or a similar type of heat exchanger to treat the incoming air to the desired temperature. For example, incoming air may be heated in cold ambient conditions so as to provide efficient part loading of the overall gas turbine system and for other purposes. This heat generally may be system waste heat with sufficient energy content or heat from an external source.

Although a power plant often produces a significant amount of waste heat, this heat is often low grade and/or non-recoverable because it is at or below the temperature of the condensate of the bottoming Rankine cycle. As a result of the relatively low overall energy content, this low grade waste heat generally may be vented or otherwise disposed of.

There is therefore a desire for improved waste heat recovery systems and methods. Such systems and methods preferably can recover relatively low grade waste heat for use in systems such as inlet air heating systems so as to improve overall system output and efficiency.

SUMMARY OF THE INVENTION

The present application thus provides a heating and cooling system for inlet air of a gas turbine engine in a combined cycle power plant having a steam turbine. The heating and cooling system may include a fluid coil positioned about the gas turbine engine, a heat exchanger in communication with the fluid coil, and a condenser in communication with the steam turbine and the heat exchanger such that waste heat from the steam turbine is forwarded to the fluid coil.

The present application further provides a method of heating inlet air for a gas turbine compressor in a combined cycle power plant having a steam turbine. The method may include the steps of positioning a fluid coil about the gas turbine compressor, placing the fluid coil in communication with a heat exchanger, flowing waste heat from a condenser of the steam turbine to a heat exchanger, recovering the waste heat in the heat exchanger, flowing the recovered waste heat from the heat exchanger to the fluid coil, and heating the inlet air for the gas turbine compressor with the recovered waste heat flowing through the fluid coil.

The present application further provides a heating and cooling system for inlet air of a combined cycle power plant having a gas turbine and a steam turbine. The heating and cooling system may include a fluid coil positioned about the gas turbine, a heat exchanger in communication with the fluid coil, a cooling tower in communication with the heat exchanger, a condenser in communication with the steam turbine and the heat exchanger such that a first stream of the waste heat from the steam turbine is forwarded to the heat exchanger from the condenser, and a cooling tower in communication with the condenser such that a second stream of the waste heat from the steam turbine is forward to the cooling tower from the condenser.

These and other features of the present application will become apparent to one of ordinary skill in the art upon review of the following detailed description when taken in conjunction with the several drawings and the appended claims.

DETAILED DESCRIPTION

Figure 1:
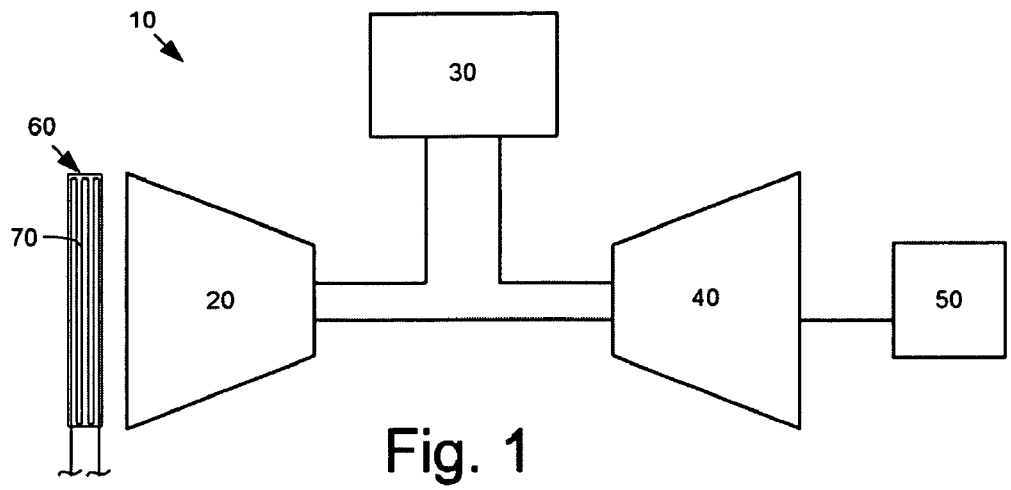
FIG. 1 is a schematic view of a gas turbine engine with an inlet air heating and cooling system.

Referring now to the drawings, in which like numerals refer to like elements throughout the several views, FIG. 1 shows a schematic view of a gas turbine engine 10. As is known, the gas turbine engine 10 may include a compressor 20 to compress an incoming flow of air. The compressor 20 delivers the compressed flow of air to a combustor 30. The combustor 30 mixes the compressed flow of air with a flow of fuel and ignites the mixture. (Although only a single combustor 30 is shown, the gas turbine engine 10 may include any number of combustors 30.) The hot combustion gases are delivered in turn to a turbine 40. The turbine 40 drives the compressor 20 and an external load 50 such as an electrical generator and the like. The gas turbine engine 10 may use natural gas, various types of syngas, and other fuels. The gas turbine engine 10 may use other configurations and components herein.

In this example, the gas turbine engine 10 further includes an inlet air heating and cooling system 60. The inlet air heating and cooling system 60 may be positioned about the compressor 20 and heats or cools the incoming airflow to a desired temperature. The inlet air heating and cooling system 60 may include a cold/hot water coil 70. Hot or cold water flows through the coil 70 and exchanges heat with the incoming airflow. The inlet air heating and cooling system 60 may use any type of heat exchange device herein. As described above, cold water generally may be provided by a water chilling plant while hot water may be provided via a waste heat recovery system or from another source.

In this example, the gas turbine engine 10 may be part of a combined cycle power plant 80. As is known, the combined cycle power plant 80 uses the exhaust from the gas turbine engine 10 so as to generate steam in a heat recovery steam generator 85. The steam is used in turn to drive a steam turbine 90 other components in a loop via a steam generator pump 95.

It is important to note that the terms "hot", "warm", "cold", and "cool", are used in a relative sense. No limitation on the applicable temperature range is intended herein.

Figure 2:
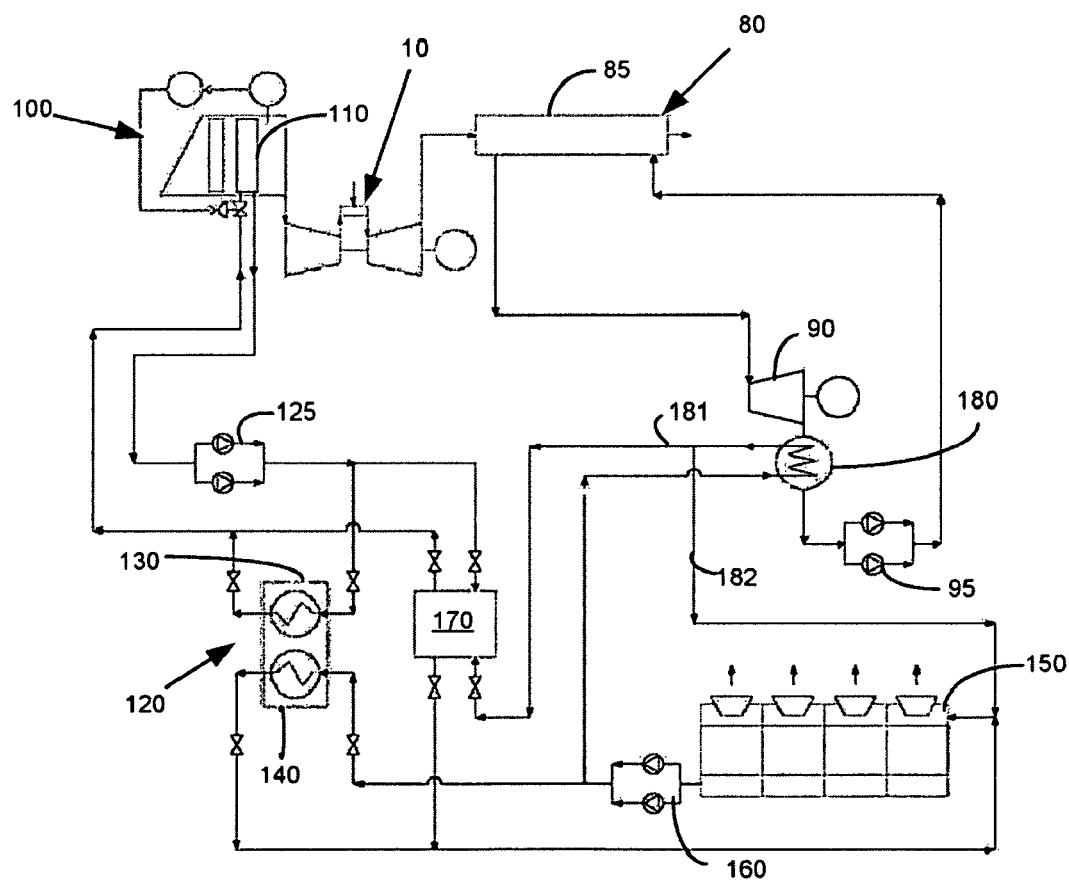
FIG. 2 is a schematic view of a gas turbine inlet air heating and cooling system configured to capture the waste heat of a steam turbine.

FIG. 2 shows an integrated turbine inlet air heating and cooling system 100 as is described herein. The turbine inlet air heating and cooling system 100 may be used with any number of gas turbine engines 10. As described above, a cold/hot water coil 110 may be positioned about the compressor 20 of each gas turbine engine 10. The cold/hot water coil 110 heats or cools the inlet air via a water stream running therethrough. Other types of heat exchange devices may be used herein.

In cooling mode, water or other types of fluids from the cold/hot water coil 110 may be piped to a water chiller 120. The water chiller 120 may be a mechanical chiller, an absorption chiller, or any conventional type of chilling device. As is known, the water chiller 120 provides cold water to the cold/ hot water coil 110 where heat in the air flow is absorbed by the chilled water passing through the cold/hot water coil 110. After exchanging heat, the now warmer chilled water is then generally returned to the water chiller 120. The water in the cold/hot water coil 110 may be piped to the water chiller 120 via a coil pump 125. Any number of water chillers 120 and pumps 125 may be used.

Each water chiller 120 generally includes an evaporator 130 and a condenser 140. The chiller evaporator provides the cold water to the cold/hot water coil 110 as is described above. Cooling water for the chiller condenser 140 may be provided by a cooling tower 150 via one or more condenser water pumps 160. Other types of cooling water sources may be used herein. As is known, the cooling tower 150 may function as a heat sink or a heat source depending upon the overall system heat balance. Other types of heat exchange devices may be used herein.

Warm water also may be provided to the cold/hot water coil 110 in a heating mode. The warm water may be provided via system waste heat or an external source. In this example, a heat recovery heat exchanger 170 may be used. Any type of heat exchange device may be used herein.

In this example, the inlet air heating and cooling system 100 may use the waste heat of the steam generator 90 via the heat recovery/heat exchanger 170. Specifically, water may be pumped from the cooling tower 150 via the condenser water pump 160 to a condenser 180 associated with the steam turbine 90. Part of the now warmed cooling water leaving the condenser 180 may flow as a first stream 181 through the heat recovery heat exchanger 170 so as to transfer heat with the fluid circulating through the cold/hot water coil 110 in the heating mode. The first stream 181 from the heat exchanger 170 then returns to the cooling tower 150. A second stream 182 leaving the condenser 180 may return directly to the cooling tower 150 so as to reduce the load on the cooling tower 150 as well as reducing overall system water consumption. Other sources of waste heat may be used herein. The heat recovery heat exchanger 170 thus may provide water to the cold/hot water coil 110 in the range of about 90 degrees Fahrenheit to about 120 degrees Fahrenheit (about 32 degrees Celsius to 49 degrees Celsius) via the recovered waste heat.

Depending on the quality and quantity of the water flow extending between the condenser 180 and the cooling tower 150, it may be possible to pump the water flow directly from the condenser 180 to the cold/hot coil 110 and then back to the cooling tower 150. In this configuration, the heat recovery/heat exchanger 170 may not be required. Other configurations may be used herein.

The inlet air heating and cooling system 100 thus recovers ultra low grade waste heat for useful and effective purposes. This waste heat can improve turbine efficiency at part load, provide anti-icing control without the use of inlet bleed heat, reduce overall water consumption, provide freeze protection for the cold/hot water coil 110 without the use of antifreeze, provide freeze protection for the inlet filters instead of conventional inlet housing deicing techniques, and other benefits. Further, these benefits are provided without a parasitic power drain on the system as a whole. Overall system efficiency thus may be increased.

It should be apparent that the foregoing relates only to certain embodiments or the present application and that numerous changes and modifications may be made herein by one of ordinary skill in the art without departing from the general spirit and scope of the invention as defined by the following claims and the equivalents thereof.

We claim:

1. A heating and cooling system for inlet air of a gas turbine engine in a combined cycle power plant having a steam turbine, the system comprising:
   a first closed fluid circuit having a first heat exchanger comprising a fluid coil positioned about an inlet of the gas turbine engine;
   the first closed fluid circuit in communication with a second heat exchanger, and the first closed circuit comprising a branched line in communication with a chiller;
   a second closed fluid circuit in communication with a condenser, the chiller, a cooling tower, and the second heat exchanger;
   the condenser in communication with the steam turbine such that waste heat from the steam turbine is forwarded to the second heat exchanger through the second closed fluid circuit, wherein the waste heat is transferred through the first closed fluid circuit to heat inlet air passing through the first heat exchanger;
   the chiller in communication with the second closed loop such that waste heat from the branched line is exchanged to the second closed loop and a fluid of the branched line is cooled, wherein the cooled fluid is forwarded through the first closed fluid circuit to cool inlet air passing through the first heat exchanger; and
   the chiller and the second heat exchanger in communication with the cooling tower such that waste heat from the condenser and the branched line is forwarded to the cooling tower, wherein a fluid of the second fluid circuit is cooled.

2. The system of claim 1, further comprising a heat recovery steam generator in communication with the steam turbine.

3. The system of claim 1, wherein the gas turbine engine comprises a compressor, and wherein the fluid coil comprises a cold, hot, or combination thereof water coil positioned about the compressor.

4. The system of claim 1, wherein the chiller comprises a chiller evaporator in communication with the first closed fluid circuit, and wherein the chiller comprises a chiller condenser in communication with the second closed fluid circuit.

5. A method of heating and cooling inlet air of a gas turbine engine in a combined cycle power plant having a steam turbine, the system comprising:
   providing a first closed fluid circuit having a first heat exchanger comprising a fluid coil positioned about an inlet of the gas turbine engine, the first closed fluid circuit in communication with a second heat exchanger, and the first closed circuit comprising a branched line in communication with a chiller;
   providing a second closed fluid circuit in communication with a condenser, the chiller, a cooling tower, and the second heat exchanger;
   forwarding waste heat from the steam turbine via the condenser to the second heat exchanger through the second closed fluid circuit, wherein the waste heat is transferred through the first closed fluid circuit to heat inlet air passing through the first heat exchanger;
   exchanging waste heat from the branched line via the chiller to the second closed loop to cool a fluid of the branched line, wherein the cooled fluid is forwarded through the first closed fluid circuit to cool inlet air passing through the first heat exchanger; and
   forwarding waste heat from the condenser via the second heat exchanger and the branched line via the chiller to the cooling tower, wherein a fluid of the second fluid circuit is cooled in the cooling tower.

\* \* \* \* \*

UNITED STATES PATENT AND TRADEMARK OFFICE
CERTIFICATE OF CORRECTION

PATENT NO. : 8,356,466 B2
APPLICATION NO. : 12/332385
DATED : January 22, 2013
INVENTOR(S) : Motakef et al.

It is certified that error appears in the above-identified patent and that said Letters Patent is hereby corrected as shown below:

In Column 2, Line 38, delete "Not" and insert -- Hot --, therefor.

In Column 3, Line 63, delete "or" and insert -- of --, therefor.

Signed and Sealed this
Nineteenth Day of March, 2013

Teresa Stanek Rea
*Acting Director of the United States Patent and Trademark Office*